INVENTOR
John W. Kulyk,
BY John H. Leonard
his ATTORNEY.

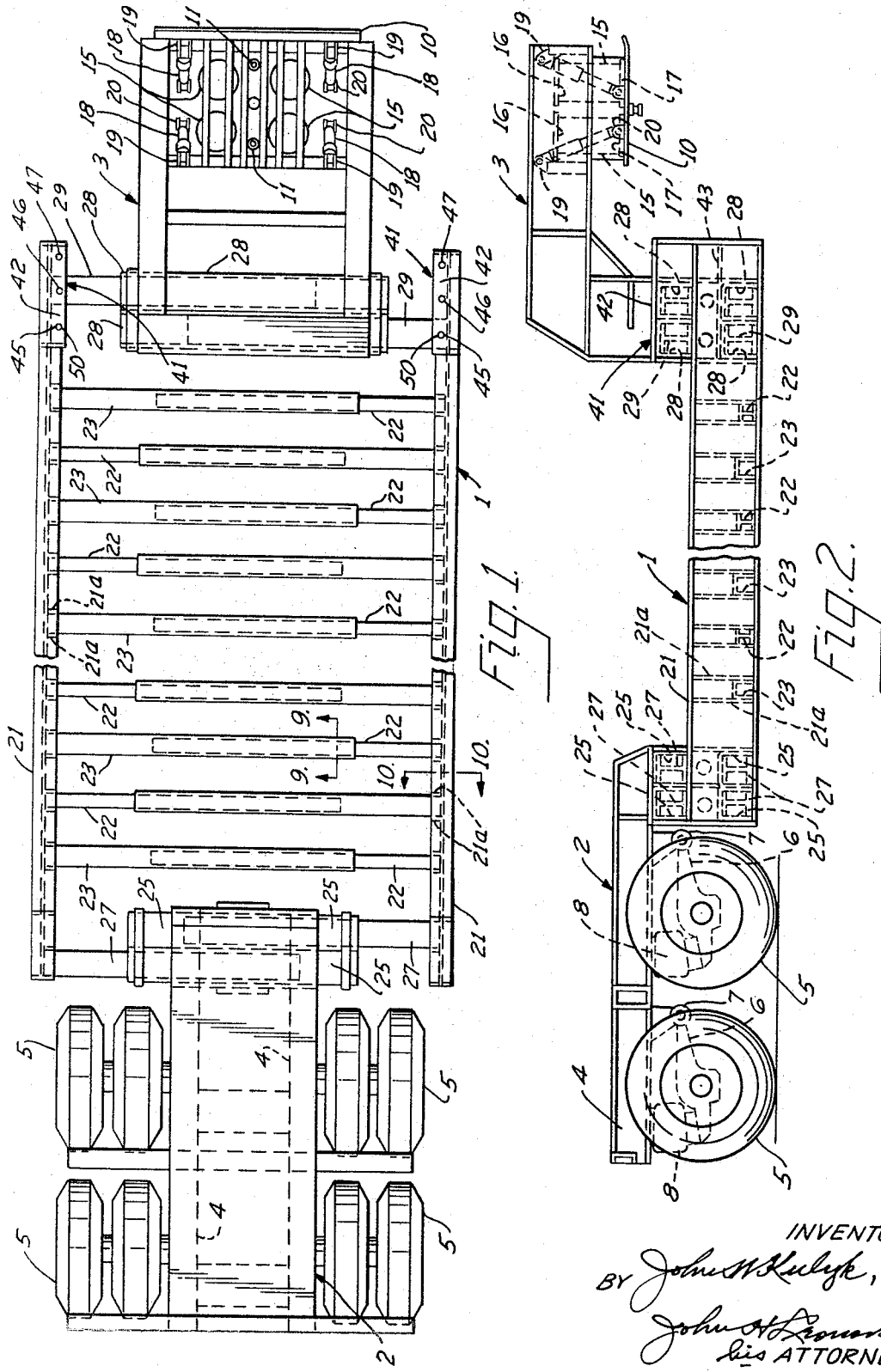

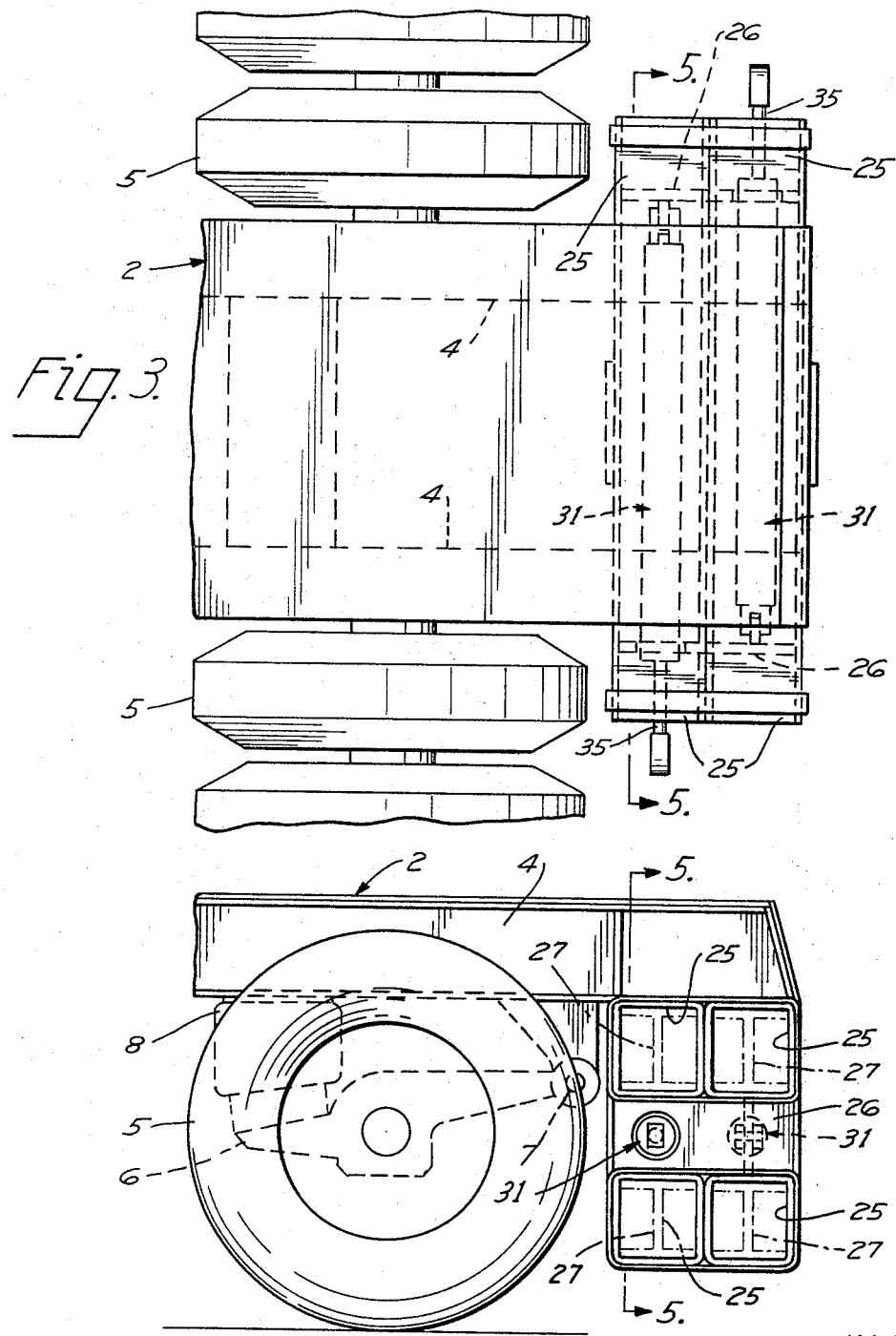

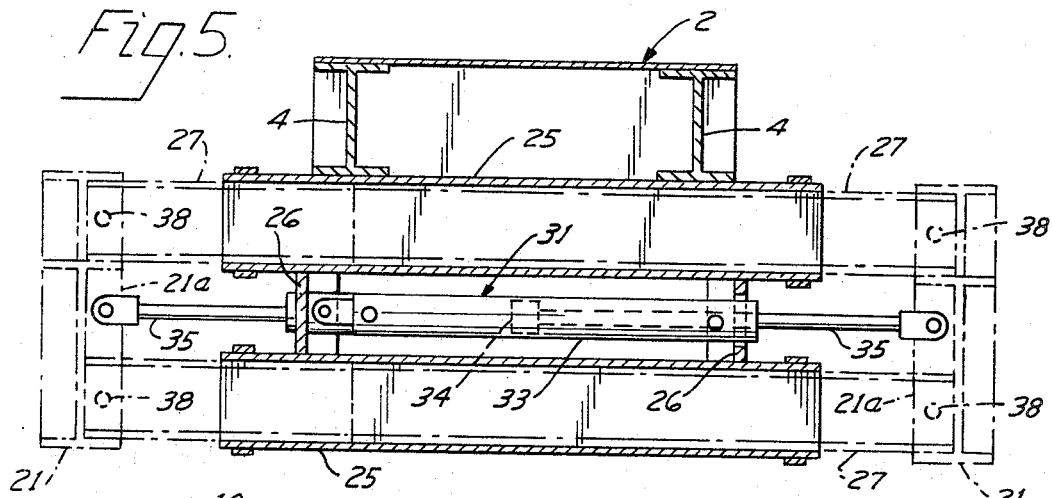
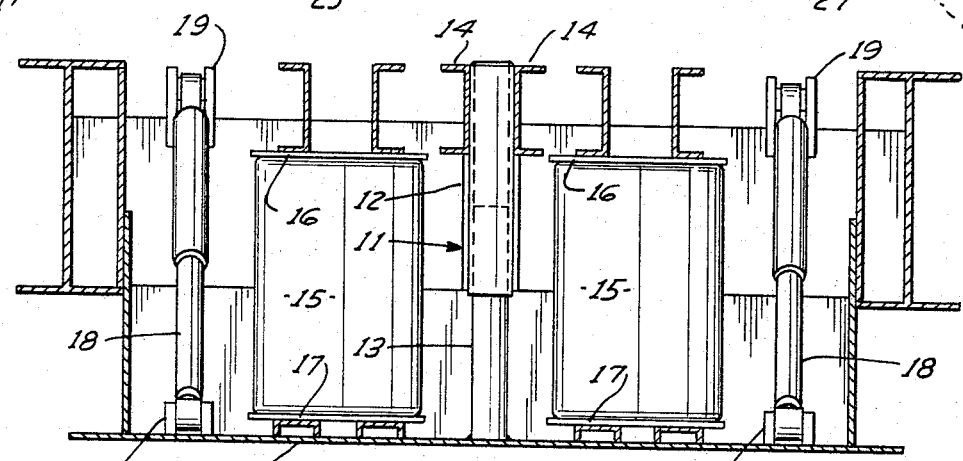
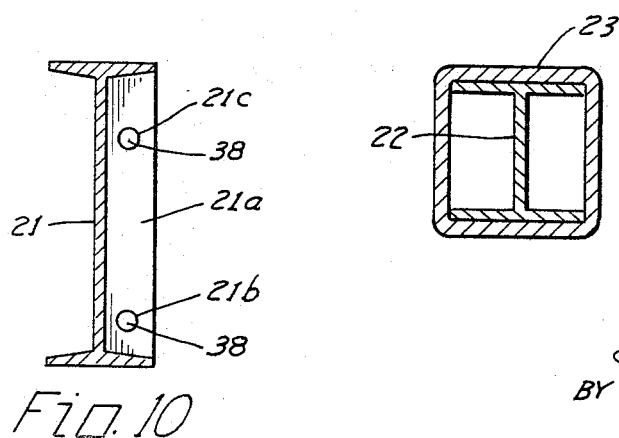
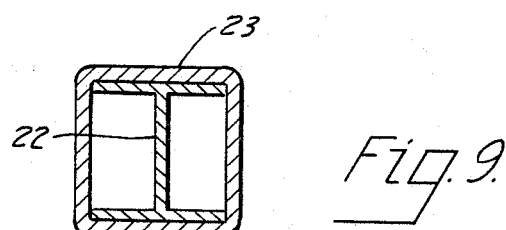

July 11, 1967                    J. W. KULYK                    3,330,574
           GROUND LOADING TRAILER WITH LATERALLY EXTENSIBLE
                         LOAD SUPPORTING BED
Filed July 21, 1965                                    5 Sheets-Sheet 5

INVENTOR.
John W. Kulyk,
BY John H. Leonard,
his ATTORNEY.

United States Patent Office 3,330,574
Patented July 11, 1967

3,330,574
GROUND LOADING TRAILER WITH LATERALLY EXTENSIBLE LOAD SUPPORTING BED
John W. Kulyk, Albion, Pa., assignor to Rogers Brothers Corporation, Albion, Pa., a corporation of Pennsylvania
Filed July 21, 1965, Ser. No. 473,680
4 Claims. (Cl. 280—34)

This invention relates to semi-trailers and particularly to semi-trailers of the drop-deck type wherein the load supporting bed is carried near to the ground and can be lowered readily to the ground for loading and unloading.

It is well known that in the transportation of some types of heavy equipment, the center of gravity of the equipment may be offset a considerable distance from the lateral mid-portion of the equipment. However, for stability during transportation it is desirable to have the center of gravity of the load as near the longitudinally extending median line of the trailer bed as possible. In such instances the load must be statbilized by the bed despite the location of the center of gravity of the load near to the median line of the bed even though this should require a portion of the load project an undue distance laterally from the median line and therefore extend beyond the normal lateral limit of the bed.

Often loads of this type are also of such height that difficulty is experienced in clearing overpasses on the roadways. For optimum results, the load supporting portion of the bed should be maintained as near to ground level as possible, having due regard to the span and strength of bed.

Though such low beds introduce problems in passing over abrupt crests of hills or of railroad crossings and the like, this particular problem can be overcome by building up ramps of planking to reduce the abruptness of the crest. However, in passing beneath over-passes and bridges, the height of the load, thickness of the bed and top of the load from the ground impose basic limitations which cannot be offset readily.

The present invention provides a load bed trailer the bed of which is extensible and contractable laterally for accommodating the various widths of unsymmetrical loads wherein the center of gravity is considerably offset from the longitudinal median line of the load itself, while supporting the load with its center of gravity at the longitudinal median line of the bed.

Another feature of the invention resides in the fifth wheel structure by which the front end support or gooseneck of the trailer is supported and coupled to the fifth wheel member of a tractor so that the fifth wheel structure can be manipulated for lifting and lowering the bed so as to maintain the bed as far above the ground as practical during free travel along a normal roadway and to lower the front end to as low a position as possible when necessary, in order to pass beneath over-passes.

A specific feature is to provide on the trailer a vertically positionable fifth wheel member of which the vertical position can be changed relative to the trailer while the fifth wheel member of the trailer supports the front end or gooseneck of the trailer on a companion fifth wheel member on a tractor, and by which the shocks due to impacts on the tractor and trailer wheels are cushioned and controlled readily so as not to be transferred to the load.

Another feature is to provide a means for manipulating the rear wheels of the tractor, in coordination with the manipulation of the fifth wheel for raising and lowering the entire bed and providing means by which both the lifting and lowering of the fifth wheel member on the tractor relative to the bed and the raising and lowering of the rear wheels relative to the bed can be effected by the air pressure source commonly provided on tractors or tractor-trailer brakes and other operations.

Various specific objects and advantages will become apparent from the following description wherein reference is made to the drawings in which:

FIG. 1 is a top plan view of a trailer embodying the principles of the present invention;

FIG. 2 is a side elevation of the structure illustrated in FIG. 1;

FIG. 3 is an enlarged fragmentary top plan view of the rear portion of the trailer showing the rear supporting assemblage and arrangement for lateral extension and retraction of the load bearing portion of the bed;

FIG. 4 is an enlarged fragmentary side elevation of the structure illustrated in FIG. 3;

FIG. 5 is a fragmentary vertical sectional view of a rear portion of the trailer and of the rear end assembly, and is taken on line 5—5 in FIGS. 3 and 4;

FIG. 8 is a fragmentary vertical sectional view of the gooseneck taken on the line 8—8 in FIG. 7;

FIG. 9 is an enlarged vertical cross-sectional view of a set of laterally extensible bed members, and is taken on line 9—9 in FIG. 2;

FIG. 10 is an enlarged fragmentary vertical cross-sectional view of the trailer bed and is taken on line 10—10 in FIG. 2;

Figure 6:
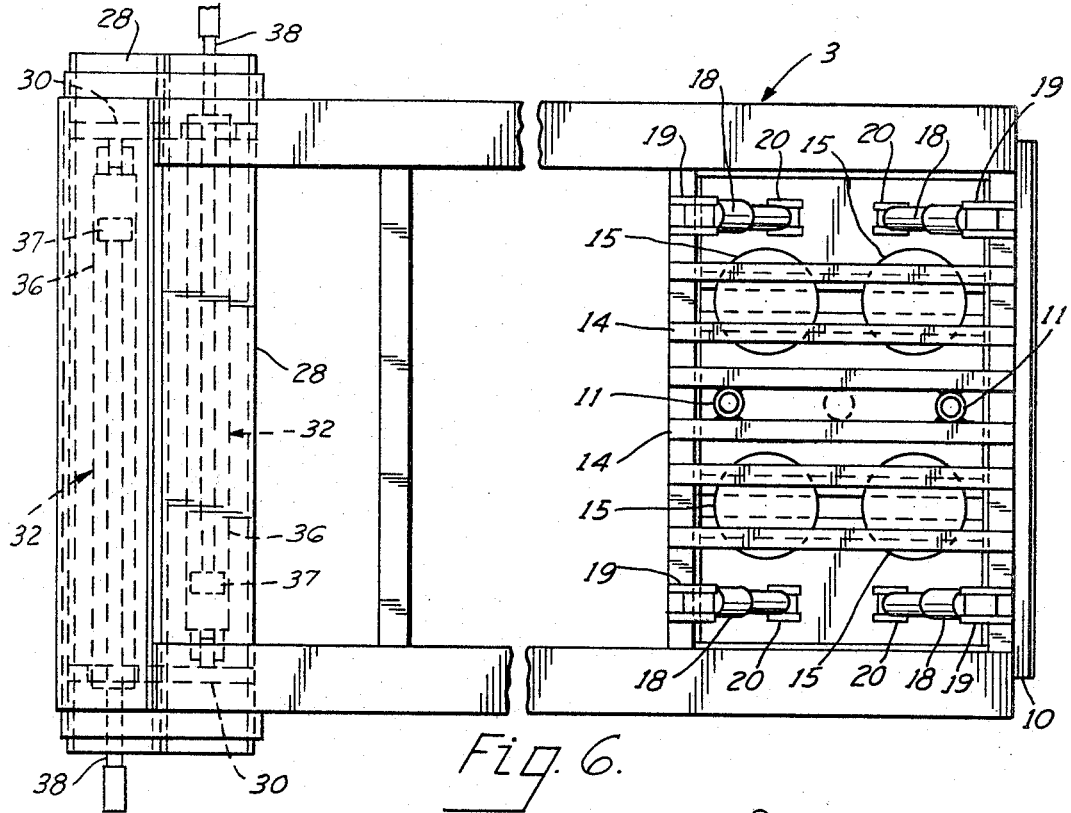
FIG. 6 is an enlarged fragmentary top plan view of the forward end and gooseneck of the trailer, showing the adjustable fifth wheel structure thereon.
Figure 7:
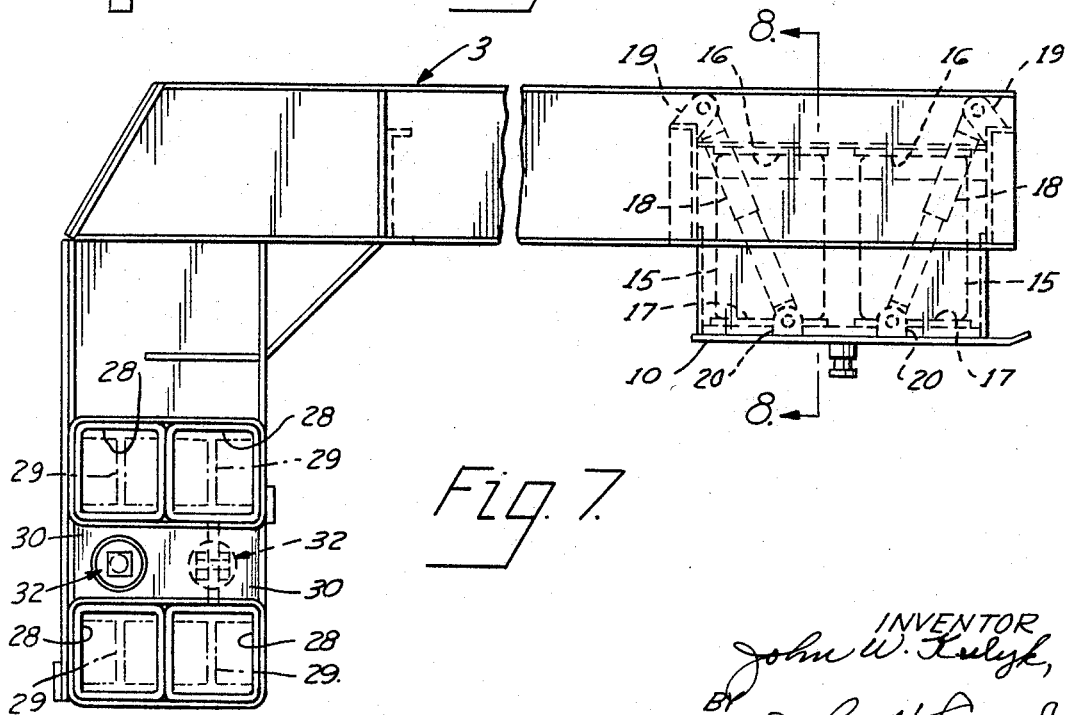
FIG. 7 is an enlarged fragmentary side elevation of the structure illustrated in FIG. 6.

Referring to the drawings, the trailer comprises a drop-deck bed 1 supported at the rear end by a rear assemblage 2 and at the front end by a front supporting assemblage or gooseneck indicated generally at 3. The rear assemblage comprises a pair of main wheel supporting beams 4 which are supported by forward and rearward sets of tandem wheels 5. All of the forward and rearward sets of wheels are duplicates and therefore only one set will be described specifically.

Since it is desirable that the rear of the bed be raised and lowered while supporting a load, the set of wheels 5 are adjustable vertically. For this purpose each set of wheels 5 is mounted on a suitable rocking beam 6 which is pivotally connected at its forward end by pivot 7 to one of the main wheel supporting beams 4 at a location forwardly of the axle of the associated wheels, at its opposite end, and rearwardly of the axle of the wheels, the rocking beam 6 is connected in supporting relative to the main wheel supporting beam 4 by means of an air spring 8, in the form of an inflatable bag. The air spring is inflatable by air pressure from the tractor source to predetermined degree, or deflated, selectively.

For raising and lowering the rear end of the bed relative to the ground surface, the air springs 8 are interposed the beams 4 and the rear end of the rocking beams 6. Such air springs can be partially inflated to different selected degrees and yet support the load, the degree of inflation controlling the distance between the beams 4 and the wheel axle. To illustrate the manipulation of the rear end of the bed while passing under an over-pass, if the road is level therebeneath, all air springs are deflated to lower the bed as much as required, up to the maximum capability. If the road dips down and then up as it passes under the under-pass, the rear springs can be partially deflated first and kept partially deflated to a greater degree than the front wheels to compensate for the down grade while maintaining the bed level, and both front front and rear springs deflated as required to obtain the lowering desired. In passing along upgrade side of the dip, the rear wheels can be correspondingly partially inflated first to maintain the bed more nearly level. This manipulation, combined with that of the fifth wheel, as will now be described, provides the minimum bed height above the roadway and also the optimum combinations of bed height above the roadway with approximately level conditions of the deck.

For supporting the front end 2 the bed for raising and lowering, a fifth wheel member 10 is connected in dependent relation to the forward overhanging elevated portion of the gooseneck for guided vertical movement by means of suitable upright guides 11. Each guide 11 composes a rigid sleeve 12 and rigid rod 13 telescopically received therein for guiding motion. The sleeve may be rigidly connected to cross beams 14 of the gooseneck and the rods may be connected to the fifth wheel member 10, thus guiding the fifth wheel member for movement in a fixed path vertically relative to the front end of the gooseneck.

For raising and lowering the gooseneck, and therefore the front end of the bed, inflatable bags or air springs 15 are provided. The springs are connected at their upper ends to the gooseneck, as indicated at 16, and at their lower ends to the fifth wheel member 10, as indicated at 17. Inflation of the springs lowers the fifth wheel member 10 and deflation permits it to rise. In form illustrated, four air springs 15 are provided, these being disposed near to the longitudinally extending median line of the gooseneck, two on one side and two on the other. The air springs 15 can be inflated to a degree necessary for supporting the weight imposed by the gooseneck while maintaining the fifth wheel member 10 in the lowered or raised direction in which it is moved.

However, shocks occur due to imparts on the tractor and trailer wheels. In order to reduce these shocks, suitable shock absorbers 18 are provided. They are connected at the upper ends to brackets 19 on the gooseneck and at their lower ends to brackets 20 on the fifth wheel member 10. The shock absorbers may be the conventional type.

As mentioned, by the manual manipulation of air springs of the rear wheel assemblages and of the fifth wheel member, optimum advantage can be taken in moving a load under an overpass.

However, it is sometimes necessary also be extend the bed laterally to obtain stability of non-symmetrical loads. For this purpose the load supporting bed of the tractor is made extensible and retractable transversely of the frame. In the illustrative example, the load supporting bed comprises two laterally spaced longitudinal main beams 21 extending forward rearwardly of the trailer. The beams 21 carry adjusting plates 21a, later to be described, and are connected together transversely to the frame by sets of telescopic members 22 and 23, respectively. One member 22 of each set is fastened at its outer end to one of the main beams 21, and the other member 23 of the same set is connected at its outer end to the opposite one of the main beams 21. As illustrated in FIG. 9, the member 22 is a rigid I-beam, and the other member 23 is a tube member in which the I-beam is accommodated telescopically from endwise movement transversely of the bed. Thus, upon moving the main beams 21 apart from each other, they are maintained rigidly in position by the members 22 and 23.

To balance the load properly, adjacent sets of the members 22 and 23 are arranged so that their tubes are connected to opposite ones of the beams 21 and the I-beams are conected to the opposite ones of the beams 21.

It is desirable that the rear assemblage 2 and the gooseneck assembly 3 remain in fixed relation to each other regardless of the manner of extension of the load bearing portion of the bed. Accordingly, for this purpose, rear assembly 2 is provided with sets of telescopic members. These sets may include tubes 25 which are fixed in rigid position relative to the main wheel supporting beams 4.

The tubes 25 are arranged in upper and lower tiers, the upper tier containing two tubes and the lower tier containing two tubes. The tubes of each tier may be welded to each other and to the beams 4, and to suitable tie plates 26 which are welded to the beams 4. The tiers are spaced apart vertically to accommodate power means for extending and retracting the main beams 21.

To connect the main beams 21 to the members 25, rigid I-beams 27 are provided. The I-beams 27 are connected at their outer ends to main beams 21 and are telescopically supported in the members 25.

The same arrangement is used for the connection between the main beams 21 and the gooseneck 3. In the form illustrated, two tubular members 28 telescopically accommodate suitable I-beams 29 which are secured at their outer ends to the beams 21. The tubular members 28 are connected to the gooseneck in tiers, in the arrangement used for the rear assemblies, suitably the tie plates 30 being connected between the upper and lower tiers. Thus not only are the load bearing portions of the bed extensible and retractible relative to each other, but also each is independently extensible and retractable relative to the longitudinally extending median line of the trailer.

In order to move the two portions of the bed toward and away from each other, suitable rear hydraulic piston cylinder assemblages 31 and front assemblages 32 are provided. Each rear assemblage 31 comprises a cylinder 33, piston 34 and rod 35. The cylinders 33 are connected to the tie or web plates 26 which connect the upper and lower rear assembly tubes in spaced relation to each other. The piston rods 35 are connected to the main girders 21, respectively.

The front assemblage 32 includes cylinders 36, pistons 37 and piston rods 38. The cylinders 36 are connected to the tie or web plates 30 and the rods to the main beams 21.

By manipulating the admission of pressure fluid to the cylinders 33 and 36, either side of the frame can be extended or retracted in relation to the longitudinally extending median line of the trailer independently of the other.

It sometimes happens that a load is of such shape that it cannot be disposed between the main beams 21 and rest on the members 22 and 23. Consequently, it is desirable to support the load on flooring at the top of the main beams 21. For this purpose, the adjusting plates 21a, heretofore mentioned, are provided. These plates are arranged in pairs at the inboard faces of the main beams 21. They are disposed with their outer edges against the webs of the beams 21 and extend from the upper flange and the lower flange of the beams. One pair of plates 21a is provided for each member 22 and one pair for each member 23. The plates of each pair are spaced apart lengthwise of the bed so that the associated member 22 or 23 can be received therebetween and held in position. The plates 21a have lower apertures 21b and upper apertures 21c. The members 22 and 23 are connected to the plates and thereby to the beams 21, by suitable pins or bolts 38 extending through the associated members and apertures 21b and 21c of the adjustment plates 21a. For loads which cannot fit between the beams 21, every other set of members 22 and 23, in a direction endwise of the trailer, is disconnected from its lower aperture 21b by removal of the pin 38 and connected to the plate at the upper aperture 21c by means of the pin 38. Thus every other set of extensible members 22 and 23 provides a deck support, substantially level with the top of the beams 21, on which planking can be laid for supporting the load.

Some states permit a great trailer length than others and a few inches variation in length sometimes is important. In order to support or to take advantage of such provisions under the laws of the various states, the gooseneck 3 is arranged to be adjusted to forwardly and rearwardly relative to the beams 21. The beams 21 are provided at the forward ends with a boxlike structure 41 having an upper plate 42 which is disposed above the upper flange of the beam 21, and a lower plate 43. The upper tier of members 29 rests on the upper flange of the main beams 21 and is engaged at the top by the plate 42. The lower tier of members 29 rests on the lower flange of the main beams 21 and is engaged at the top by the plates 43. The ends of the members 29 fit snugly between their respective plates and the flanges. The plates 42 and 43, and the upper and lower flanges of the main beams 21 are provided with aligned apertures 45, 46 and 47. The members 29 can be slid forwardly and rearwardly of the beams 21 to different positions. The apertures are positioned so that the desired fore and aft positions of the members 29, pins 50 are dropped through the aligned sets of apertures and anchor the outer ends of the members 29 to the main beams 21.

It is apparent that with this arrangement, the members 29 can be moved forwardly a distance equal to the longitudinal space between two apertures and anchored firmly in place.

Figure 11:
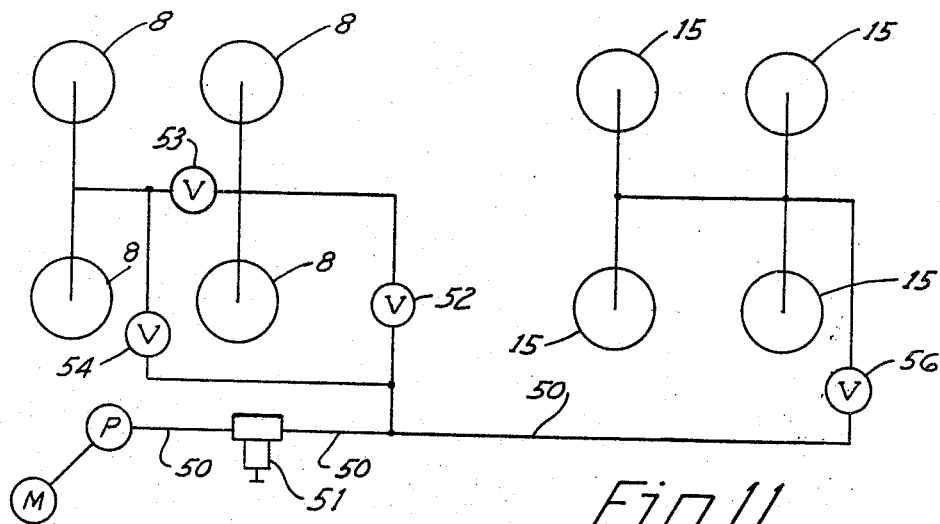
FIG. 11 is a diagrammatic illustration showing the air supply circuit for certain operating parts of the trailer.

In order to inflate and deflate the air springs 8 for the rear wheels and the air springs 15 for the fifth wheel, the system diagrammatically illustrated in FIG. 11 is provided. As there shown, pressure from a suitable air line 50, supplied by a motor driven pump on the tractor, passes through a suitable pressure regulator 51 which precludes the bleeding of the brake system in event of any leaks in the air spring system. The air passes to an on, vent, and stop valve 52 which controls the operation of the air springs 8, causing them to be inflated, air locked in inflated condition and vented to the atmosphere, selectively. The air springs 8 may be connected in parallel with each other so that all inflate concurrently under the control of the valve 52. On the other hand, it may be desirable to control the forward air springs 8 independently of the rear air springs 8, and vice versa. If so, a suitable on-off valve 53 may be disposed in the air line between the front and rear springs, and an auxiliary, on, vent, and stop 54 may be connected to the rear springs 8 and to the line 50 in by-passing relative to the valves 52 and 53. As a further refinement for special conditions, individual on, vent, and stop valves may be provided for the air springs 8, respectively.

All of the air springs 15 are operated concurrently under all conditions and therefore, as illustrated in FIG. 11, they are connected in parallel and controlled by a single on, vent, and stop valve 56. Thus, by manipulating the valves the air springs can be inflated, locked in inflated condition, or vented to the atmosphere, as desired.

Figure 12:
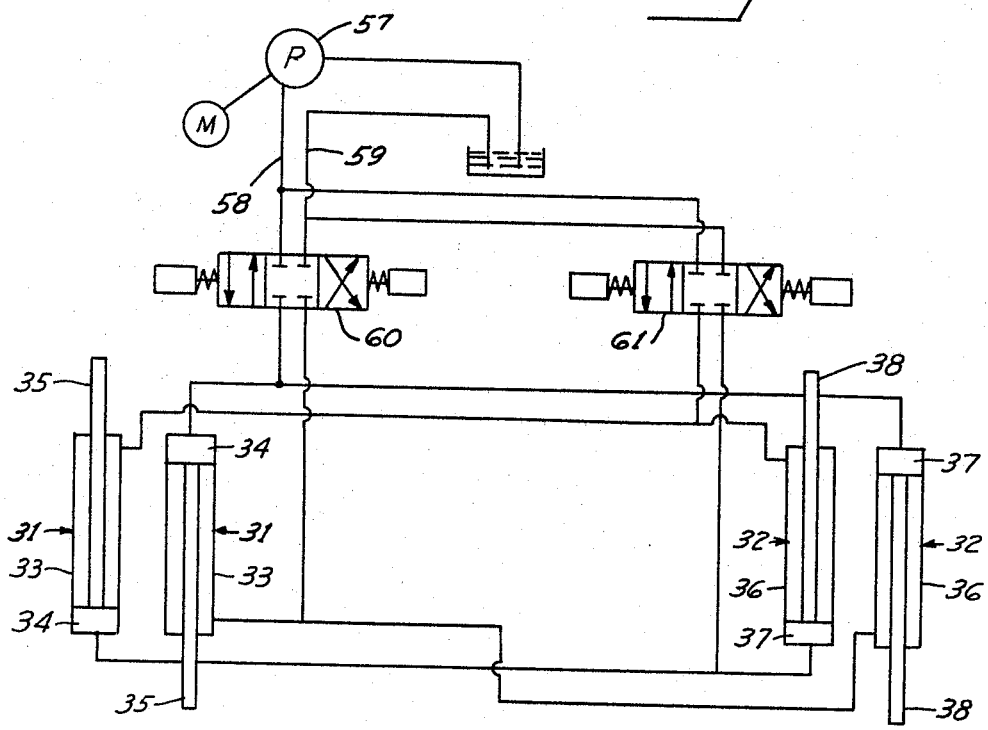
FIG. 12 is a hydraulic diagram showing the operation of the power mechanism for extending and retracting the load bearing portion of the bed laterally.

As diagrammatically illustrated in FIG. 12, hydraulic pressure fluid is supplied by suitable motor driven pump 57, having a pressure line of 58 and return line 59. One rear assemblage 31 and one front assemblage 32 for extending the right hand side of the bed are connected in parallel to a suitable stop and reversing valve 60, so that these assemblages can be operated concurrently. Likewise, the other rear assemblage 31 and front assemblage 32 for the left side of the bed can be connected in parallel to the pump through a suitable stop and reversing valve 61. Thus, either side of the bed can be extended or retracted independently of the other.

In some cases it may be that a binding action might occur and it would be desirable to provide individual valves such as described for each of the assemblages 31 and 32, so that by controlling each assembly independently of the others, an inching operation can be obtained for relieving any binding action. However, since extension and retraction is usually performed only when there is no load on the bed, little difficulty in this connection is experienced.

It is apparent from the foregoing description that either side of the bed can be extended individually to the amount desired within its maximum limits totally independently of the other side. Further, both sides can be extended to the degree desired within maximum limits.

Again, by manipulating the air springs the bed can be lowered, raised, tilted fore and aft about a traversed axis, or tilted laterally about a longitudinal axis, so as to take best possible advantage of the situation presented when passing beneath an overpass. Finally, the gooseneck 3 can be adjusted forwardly and rearwardly to different positions, to take full advantage of the maximum length permitted by state laws for such trailers.

I claim:
1. A semi-trailer comprising:
  a wheeled rear assembly;
  a gooseneck assembly;
  a bed supported at its ends by the assemblies,
  respectively, said bed comprising two load supporting portions aligned with each other laterally of the bed;
  first connecting means on said bed portions connecting said bed portions together for movement laterally of the bed relative to each other to a plurality of extended positions and to a plurality of retracted positions while maintaining the portions in co-planar relation to each other;
  power means drivingly connected to the portions for moving them to said positions;
  means to control the power means for causing the power means to move the portions to said positions, selectively;
  said assemblies being fixed in dimension laterally of the bed;
  the bed portions extending fore and aft of the bed from the rear assembly to the gooseneck assembly;
  additional connecting means connecting each bed portion to both assemblies for movement of each portion laterally relative to the assemblies independently of movement of the other bed portion relative to the assemblies; and
  said additional connecting means for each assembly comprising a plurality of rigid tubular members arranged side by side in a group and extending endwise transversely of the associated assembly and secured in fixed position on the associated assembly, and rigid telescopic members on the two bed portions, respectively, the rigid telescopic members of one bed portion being telescopically accommodated in some of the tubular members on each assembly and the rigid telescopic members of the other bed portion being telescopically accommodated in others of the tubular members on each assembly.

2. A semi-trailer comprising:
  a wheeled rear assembly;
  a gooseneck assembly;
  a bed supported at its ends by the assemblies, respectively, said bed comprising two load supporting portions aligned with each other laterally of the bed;
  first connecting means on said bed portions connecting said bed portions together for movement laterally of the bed relative to each other to a plurality of extended positions and to a plurality of retracted positions while maintaining the portions in co-planar relation to each other;
  power means drivingly connected to the portions for moving them to said positions;
  means to control the power means for causing the power means to move the portions to said positions, selectively;
  said assemblies being fixed in dimension laterally of the bed;
  the bed portions extending fore and aft of the bed from the rear assembly to the gooseneck assembly;
  additional connecting means connecting each bed portion to both assemblies for movement of each portion laterally relative to the assemblies independently of movement of the other bed portion relative to the assemblies;
  said additional connection means for each assembly comprising fixed members secured in fixed positions on the assemblies, respectively, and extending endwise transversely of the bed, and members on said bed portions, respectively, telescopically connected to said fixed members, respectively, for extension and retraction relative to each other transversely of the bed;

the supporting bed portions extending from outboard of the assemblies in the inboard direction past the longitudinal median line of the bed; and said first connecting means connecting the bed portions telescopically directly to each other so that each is movable transversely of said bed independently of the other.

3. A semi-trailer comprising:

a wheeled rear assembly;

a gooseneck assembly;

a bed supported at its ends by the assemblies, respectively, said bed comprising two load supporting portions aligned with each other laterally of the bed;

each bed portion comprising a main beam and a plurality of load supporting rigid cross beams connected at their outboard ends thereto and extending transversely of the main beam toward the main beam of the other bed portion;

said cross beams being arranged in a row extending endwise of the bed, the cross beams of one main beam being telescopically connected directly to the cross beams of the other main beam, respectively, and in co-planar relation thereto for movement to relatively extended and retracted positions endwise for extending and retracting the bed laterally;

said assemblies being fixed in dimension laterally of the bed;

the bed portions extending fore and aft of the bed from the rear assembly to the gooseneck assembly;

additional connecting means connecting each bed portion to both assemblies for movement of each bed portion laterally of the bed relative to each assembly independently of the movement of the other bed portion;

said additional connecting means comprising fixed members secured in fixed positions on the assemblies, respectively, and extending endwise transversely of the bed, and members on said bed portions telescopically connected to said fixed members for extension and retraction relative to each other transversely of the bed.

4. A trailer according to claim 3 wherein each set of cross beams comprises a rigid tubular beam on one main beam and a rigid beam on the other main beam telescopically mounted in the tubular beam of the set;

the sets are arranged in spaced side by side relation in a row which extends endwise of the bed;

the tubular beams of adjacent sets are connected to opposite ones of the main beams; and the inserted rigid beam members of said adjacent sets are connected to the main beam opposite from the one to which their associated tubular beams are connected.

References Cited

UNITED STATES PATENTS

| | | | |
|---|---|---|---|
| 2,491,044 | 12/1949 | Holland | 280—34 |
| 2,743,936 | 5/1956 | Bigge | 280—34 |
| 2,821,409 | 1/1958 | Chalmers | 280—440 |
| 2,844,265 | 7/1958 | Clark | 214—506 |
| 2,863,674 | 12/1958 | Baade | 280—439 |
| 3,145,864 | 8/1964 | Arnold | 214—396 |
| 3,239,238 | 3/1966 | Van Raden | 280—425 |
| 3,245,714 | 4/1966 | Blair | 296—26 |

GERALD M. FORLENZA, *Primary Examiner.*

ALBERT J. MAKAY, *Examiner.*